(12) United States Patent
Cheng et al.

(10) Patent No.: US 8,792,333 B2
(45) Date of Patent: Jul. 29, 2014

(54) FAILOVER PROCEDURE FOR NETWORKS (75) Inventors: Linda Tin-Wen Cheng, San Jose, CA (US); Krishna Kumar Vavilala, Cedar Park, TX (US)

(73) Assignee: Cisco Technology, Inc., San Jose, CA (US)

(*) Notice: Subject to any disclaimer, the term of this patent is extended or adjusted under 35 U.S.C. 154(b) by 123 days.

(21) Appl. No.: 13/451,861

(22) Filed: Apr. 20, 2012

(65) Prior Publication Data

US 2013/0279320 A1 Oct. 24, 2013

(51) Int. Cl.
*H04L 12/26* (2006.01)

(52) U.S. Cl.
USPC .......................................................... 370/218

(58) Field of Classification Search
USPC ......... 370/216–226, 229, 230, 236, 237, 241, 370/242–258
See application file for complete search history.

(56) References Cited

U.S. PATENT DOCUMENTS

| | | | |
|---|---|---|---|
| 6,535,490 B1 * | 3/2003 | Jain | 370/256 |
| 6,717,922 B2 * | 4/2004 | Kamat et al. | 370/258 |
| 7,274,656 B2 | 9/2007 | Lee et al. | |
| 8,014,301 B2 * | 9/2011 | Kuo et al. | 370/242 |
| 8,248,920 B2 * | 8/2012 | Tallet | 370/222 |
| 2009/0016214 A1 * | 1/2009 | Alluisi et al. | 370/228 |

OTHER PUBLICATIONS

Tallet, Understanding Resilient Ethernet Protocol Operation, Cisco Systems, Inc., 49 pages, 2006.*
Huynh et al. "RRR: Rapid Ring Recovery, Sub-millisecond Decentralized Recovery for Ethernet Ring".
Cisco: "Cisco Resilient Ethernet Protocol" Jan. 2, 2008.
Cisco: "Cisco Catalyst 2960-S FlexStack: Description, Usage, and Best Practices" 2012.
U.S. Appl. No. 13/450,959, filed Apr. 19, 2012, Inventor: Krishna Kumar Vavilala et al.

* cited by examiner

Primary Examiner — Frank Duong
(74) Attorney, Agent, or Firm — Tucker Ellis LLP (57) ABSTRACT In an example embodiment, there is disclosed an apparatus comprising a plurality of ports and routing logic coupled with the plurality of ports. The routing logic obtains data representative of a first port configuration for the plurality of ports, the first port configuration comprises data representative of a status for individual ports selected from the plurality of ports, the status indicating whether an individual port selected from the plurality of ports is an open port, an alternate port, or a failed port. The routing logic forwards data in accordance with the first port configuration. The routing logic also obtains data representative of an alternate port configuration for the plurality of ports, the alternate port configuration is to be employed upon determining a predefined link has failed. The alternate configuration comprising a new status for individual ports selected from the plurality of ports.

20 Claims, 4 Drawing Sheets

FAILOVER PROCEDURE FOR NETWORKS

TECHNICAL FIELD

The present disclosure relates generally to network availability.

BACKGROUND

Many protocols, such as a Spanning Tree Protocol (STP), are employed to determine appropriate routes for network traffic. In determining the appropriate routes, the protocols may block certain links in an attempt to prevent looping of packets, which may be referred to as a network storm. These protocols may take seconds to converge, which may be acceptable during network startup. However, during operation, when an event occurs that changes the topology of a network, such as a link failure, the protocol must re-converge and delays of this magnitude can be seriously disruptive due to packet loss during the reconvergence time. For example, applications with strict Quality of Service (QoS) constraints, such as voice over internet protocol (VoIP), may fail. For example, a VoIP call could be dropped.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Overview

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a plurality of ports and routing logic coupled with the plurality of ports. The routing logic obtains data representative of a first port configuration for the plurality of ports, the first port configuration comprises data representative of a status for individual ports selected from the plurality of ports, the status indicating whether an individual port selected from the plurality of ports is an open port, an alternate port, or a failed port. The routing logic forwards data in accordance with the first port configuration. The routing logic also obtains data representative of an alternate port configuration for the plurality of ports, the alternate port configuration is to be employed upon determining a predefined link has failed. The alternate configuration comprising a new status for individual ports selected from the plurality of ports.

In accordance with an example embodiment, there is disclosed herein, logic encoded in a non-transitory tangible computer readable medium for execution by a processor and when executed operable to determining a topology of a network. The logic determines a first configuration based on the topology, the first configuration comprising data representative of open ports and alternate ports for a routing device coupled with the network. The logic also determines an alternate configuration based on the topology, the alternate configuration comprising data representative of open ports and alternate ports for the routing device to use in response to a predefined link failing.

DETAILED DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is disclosed herein a technique for handling link failures in a network. During the initial configuration, devices are initially connected with ports in the blocking state. A device such as a server, or devices, in the network build a map of the topology of the network using a routing protocol. Any suitable routing protocol that can determine the topology of the network may be employed. A protocol, such as Multiple Spanning Tree (MST), is employed to create a topology that is free of loops.

During the configuration process, a failover topology is calculated. The failover topology determines a response to a link failure. In particular embodiments, the failover topology will determine responses for multiple link failures. For example, a protocol such as IS-IS (Intermediate System to Intermediate System—RFC 1142) can be used to allow devices in the topology to learn the topology of the whole network. The devices would be able to calculate failover scenarios, as an alternative to a master device calculating the failover scenarios and then distributing them to the devices.

Link failure can be detected using any suitable technique. For example, Physical Layer (PHY) devices can detect link failure. In particular embodiments, the PHY may be polled. In an example embodiment, link failure can be detected based on hello packets. For example, a port sends to its link partner one packet per a predetermined (programmable) time period.

The port sets an interrupt when no hello packet is received in three programmable time periods. Further, when the port detects link failure, the port generates a multicast packet, referred to herein as a Hardware Flood Layer (HFL) packet, which is employed to announce the link failure to devices in the network.

A device receiving an HFL notification will forward the notification to other ports coupled with the topology as well as to its own Central Processing Unit (CPU) and/or in a stack environment, other CPUs in a stack. Based on data representative of where the failure occurred in the HFL notification, a device receiving the HFL may add a port (or unblock a previously blocked port), delete a port (or change a port to a blocked state), or do nothing, In the event of Virtual Local Area Network (VLAN) load balancing across multiple ports, if a port fails the load can be distributed among the remaining ports (e.g., if two ports are used for VLAN balancing and one of the ports fails, VLAN traffic may be re-routed to the remaining port).

Figure 1:
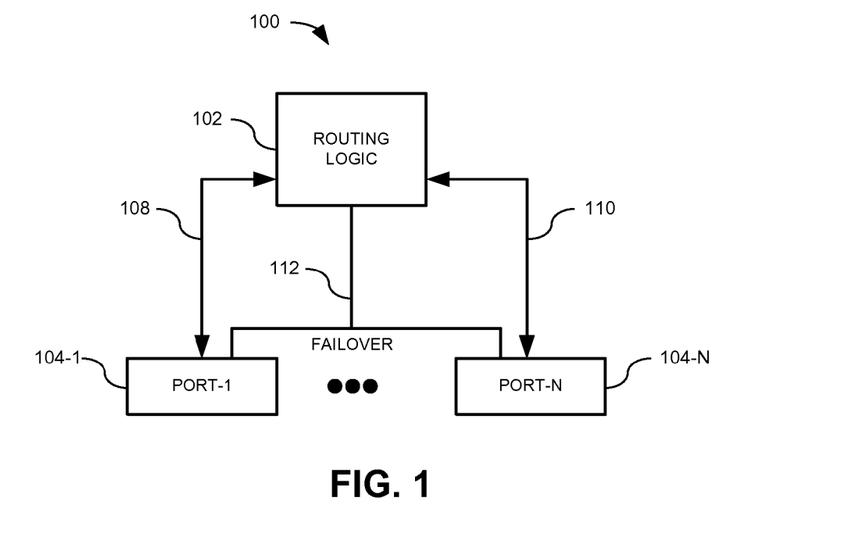
FIG. 1 is a block diagram illustrating an example of a switching device upon which an example embodiment may be implemented.

FIG. 1 is a block diagram illustrating an example of a switching device 100 upon which an example embodiment may be implemented. The switching device 100 comprises routing logic 102 that determines how packets should be routed. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules at one or more locations configured to perform one or more functions. For example, the routing logic 102 may suitably comprises a host processor and software for performing the functionality described herein. In an example embodiment, the routing logic 102 comprises forwarding tables for determining how to route packets.

The switching device 100 comprises a plurality (or N) of ports 104-1 through 104-N, where N is an integer greater than one. For example, in N may be two (e.g., in a ring network), or N may be as high as is physically realizable (e.g., in a spanning tree network or other any other network topology including a ring network). The routing logic 102 can selectively route data through port-1 104-1 via path 108 and/or through port 104-N via path 110. A port may be considered an open port, an alternate (or blocked) port, or a failed port. An open port is a port that is forwarding traffic. An alternate (or blocked) port is an operational port that is blocked, e.g., traffic is not being forwarded. A failed port is a port with a non-operational link status. Ports 104-1, 104-N may be wired ports, wireless ports, or a combination of wired and wireless ports.

In an example embodiment, the routing logic 102 obtains data representative of a first port configuration for the plurality of ports 104-1, 104-N. The first port configuration comprises data representative of a status for individual ports selected from the plurality of ports, the status indicating whether an individual port selected from the plurality of ports is an open port, an alternate port, or a failed port. The routing logic 102 forwards data in accordance with the first configuration. The routing logic 102 also obtains data representative of an alternate port configuration for the plurality of ports 104-1, 104-N. The alternate port configuration is to be employed upon determining a predefined link has failed. The alternate configuration comprises a new status for individual ports selected from the plurality of ports.

In an example embodiment, the routing logic 102 switches to the alternate port configuration in response to determining the predefined link has failed. The notification of the failed link is propagated though open ports and alternate ports selected from the plurality of ports 104-1, 104-N.

In an example embodiment, the predefined link is connected to a selected one of the plurality of ports 104-1, 104-N. The routing logic 102 switches to the alternate port configuration in response to detecting the predefined link has failed. The routing logic generates the notification of the failed link that is propagated through the open ports and alternate ports. In an example embodiment, a failed link is detected by polling the selected one of the plurality of ports. In another example embodiment, a failed link is detected in response to not receiving a predefined packet at the selected one of the plurality of ports for more than a predefined time period. For example, if a "hello" packet has not been received for a time period, which may comprise a plurality of periodic and/or aperiodic intervals, the routing logic 102 determines the link has failed.

In an example embodiment, the routing logic 102 receives a predefined packet indicating the predefined link has failed. For example, a HFL packet as described herein supra may be employed. In particular embodiments, the predefined packet comprises data representative of an identifier for the failed link.

In an example embodiment, the routing logic 102 stops forwarding traffic in response to determining the predefined link has failed. The routing logic 102 waits for a predetermined time period after determining the predefined link has failed before forwarding traffic as specified by the alternate port configuration.

In an example embodiment, the routing logic 102 obtains data representative of a second alternate port configuration to be employed in response to a second link failing while employing the first alternate configuration. The routing logic 102 may receive the data representative of a second alternate port configuration from another device or may determine the second alternate port configuration itself. In particular embodiments, the routing logic 102 waits for a specified time period before determining the second alternate port configuration.

In an example embodiment, the data representative of a first configuration and the data representative of an alternate configuration comprise separate port statuses for individual ports selected from the plurality of ports on a per virtual local area network (VLAN) basis for a plurality of VLANs. For example, port 104-1 may be open port for a first VLAN but an alternate (blocked) port for a second VLAN. In particular embodiments, multiple ports may be employed for a VLAN for load balancing.

In an example embodiment, the routing logic 102 determines a topology of a network coupled with the plurality of ports 104-1, 104-N. For example, routing logic 102 may send and receive packets requesting devices coupled to a port respond with their address and addresses of any devices they detect on their ports. The routing logic 102 determines the first configuration and alternate configuration based on the topology.

In an example embodiment, the alternate port configuration may suitably comprise a plurality of alternate configurations. For example, the data representative of an alternate port configuration may suitably comprise data representative of a first alternate port configuration to be employed upon determining a first predefined link has failed, and data representative of a second alternate port configuration to be employed upon determining a second predefined failed link. Thus, the data representative of an alternate port configuration comprises data representative of a plurality of alternate port configurations corresponding to a plurality of predefined link failures.

In an example embodiment, a failover signal 112 may be employed for indicating when a link has failed. The failover signal 112 may be a signal that is asserted by a port receiving a notification of a failed link or by the routing logic 102 in response to determining a link attached to one of ports 104-1, 104-N has failed. In an alternative embodiment, the failover signal 112 may be a register or latch that is set. The failover signal 112 may be cleared after a predetermined time period or event. For example, the failover signal 112 may be cleared after new alternate configurations are determined.

Figure 2:
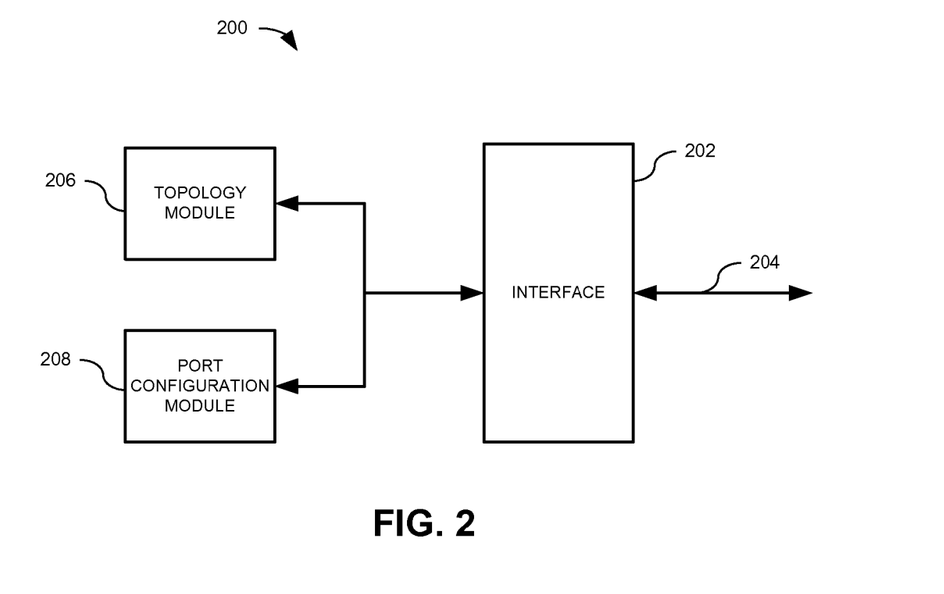
FIG. 2 is a block diagram illustrating an example of a device for determining a network topology, the appropriate links for the topology and a failover configuration for the network topology.

FIG. 2 is a block diagram illustrating an example of a device 200 for determining a network topology, the appropriate links for the topology and a failover configuration for the network topology. Device 200 may be implemented by a server or be embodied in a routing device such as a switch and/or router. In the illustrated example, the device 200 comprises an interface 202 coupled with a link 204 that allows for communications with external devices, such as other routing devices coupled with a network. Interface may be any suitable wired and/or wireless interface.

In an example embodiment, the topology module 206 sends packets comprising data representative of other devices detected on link 204 by interface 202. In addition, topology module 206 receives packets from other devices via interface 202 that comprise data representative of devices the other devices detected on their ports. Based on the data received from the other devices and other devices detected on link 204 by interface 202, the topology module 206 determines a topology for the network.

The port configuration module 208 determines from the topology a first port configuration for devices on the network. In an example embodiment, the topology module 206 determines a configuration that is free of loops to prevent network storms.

The port configuration module 208 determines an alternate port configuration for the devices on the network. The alternate configuration assumes a particular link has failed and is a configuration to be employed in the event the particular link fails. In particular embodiments, the port configuration module 208 determines a plurality of alternate port configurations. The plurality of alternate port configurations correspond to a plurality of different link failure scenarios.

Figure 3:
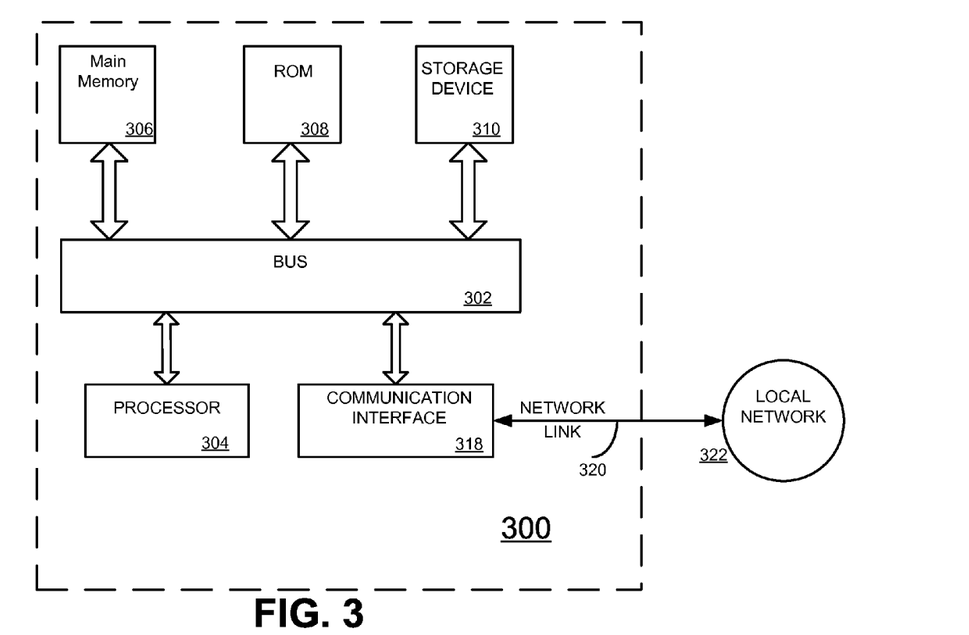
FIG. 3 is a block diagram of a computer system upon which an example embodiment may be implemented.

FIG. 3 is a block diagram of a computer system 300 upon which an example embodiment may be implemented. Computer system 300 is suitable for implementing the route control logic 102 described in FIG. 1, the topology module 206 described in FIG. 2, and/or the port configuration module 208 described in FIG. 2.

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, and/or flash storage, is provided and coupled to bus 302 for storing information and instructions.

An aspect of the example embodiment is related to the use of computer system 300 for implementing a failover procedure for networks. According to an example embodiment, implementing the failover procedure for networks is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, and volatile media. Non-volatile media include for example optical or magnetic disks, such as storage device 310. Volatile media include dynamic memory such as main memory 306. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 300 also includes a communication interface 318 coupled to bus 302. Communication interface 318 provides a two-way data communication coupling computer system 300 to a network link 320 that is connected to a local network 322. Communication interface 318 allows processor 304 to send and receive messages regarding the network topology and/or network failovers. For example, processor 304 may receive data representative of a failed link via communication interface 318. In particular embodiments, computer system may suitably comprise multiple communication interfaces 318 which may be coupled to one or more networks or one or more segments of a network.

Figure 4:
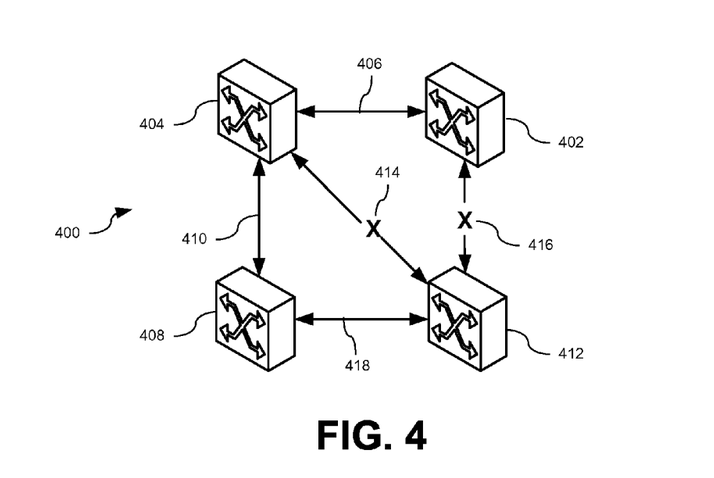
FIG. 4 is a block diagram of a ring network for illustrating an example embodiment.

FIG. 4 is a block diagram of a ring network 400 for illustrating an example embodiment. Switches 402 and 404 are coupled via link 406. Switches 404 and 408 are coupled via link 410. Switch 404 is also coupled with switch 412 via link 414. Switches 408 and 412 are coupled via link 418. Switch 412 is also coupled with switch 402 via link 416. In the illustrated example, in order to prevent looping or network storms, ports coupled with links 414 and 416 are configured to be in an alternate (blocked state).

Alternate configurations can be generated based on various link failures. For example, if link 406 fails, an alternate configuration can be employed where ports coupled to links 414 and 416 can be changed to the open state. If link 410 fails, an alternate configuration can be employed where ports coupled with link 414 are changed to the open state, while ports coupled to link 416 remain in the alternate (blocked) state. If link 418 fails, an alternate configuration can be employed where ports coupled with links 414 and 416 are changed to the open state. In particular embodiments, multiple link failures may be accommodated. For example, if links 406 and 418 fail, an alternate port configuration opening ports coupled with links 414 and 416 can be employed.

Figure 5:
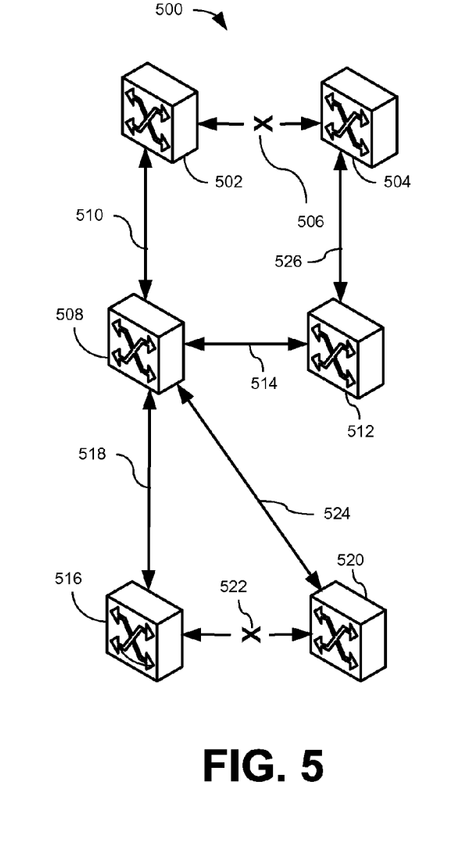
FIG. 5 is a block diagram illustrating an example of a spanning tree network topology as initially configured.

FIG. 5 is a block diagram illustrating an example of a spanning tree network 500 topology as initially configured. In the illustrated example, switch 502 is coupled with switch 504 via link 506. Switch 502 is also coupled with switch 508 via link 510. Switch 508 is coupled with switch 512 via link 514. Switch 508 is coupled with switch 516 via link 518. Switch 516 is also coupled with switch 520 via link 522. Switch 520 is coupled with switch 508 via link 524. Switch 504 is also coupled with switch 512 via link 526. Links 506, 510, 514, 518, 522, 524, and 526 may suitably comprise wired, wireless, and or a combination of wired and wireless links. In the illustrated example, links 510, 514, 518, 524, and 526 are in the open state, and links 506 and 522 are in the alternate (blocked) state to prevent looping. The switches 502, 504, 508, 512, 516, and 520 also obtain an alternate configuration. The alternate configuration may be provided to the switches 502, 504, 508, 512, 516, and 520, or the switches 502, 504, 508, 512, 516, and 520 may calculate the alternate configurations.

For example, the switches 502 and 504 may employ an alternate configuration where the ports coupled with link 506 switch from the alternate to the open state if links 506, 510, and/or 514 fail. An alternate configuration may be employed where switches 516 and 520 switch the ports coupled with link 522 to the open state in response to detecting a failure of link 518 and/or 524.

Figure 6:
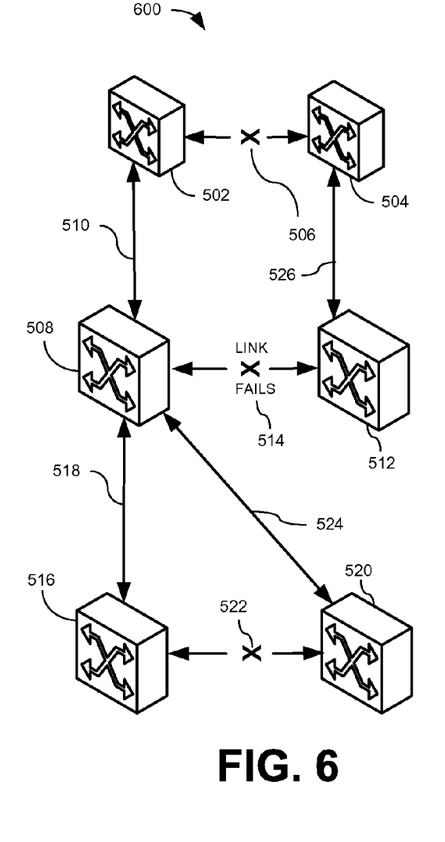
FIG. 6 illustrates an example of a link failure in the spanning tree network illustrated in FIG. 5.

FIG. 6 illustrates an example of the state 600 of the spanning tree network 500 illustrated in FIG. 5 when link 514 fails. In response to the failure, switches 512 and 508 generate link failure notification signals and send them on their non-failed (e.g., open and alternate) ports. For example, switch 508 would propagate the notification on links 510, 518 and 524 while switch 512 would propagate the failure on link 526. The notification would be propagated throughout the network. In particular embodiments, the notification would include data identifying the failed link, link 514 in this example.

In an example embodiment, the switches 502, 504, 508, 512, 516, and 520 in response to detecting the link failure or receiving a notification of the link failure, would enter a "quiet period" where the switches 502, 504, 508, 512, 516, and 520 would stop forwarding packets for a predefined time period. In an example embodiment, a predefined time period is selected that would allow for the notification to propagate throughout the network and for devices to connect to the alternate configuration.

Figure 7:
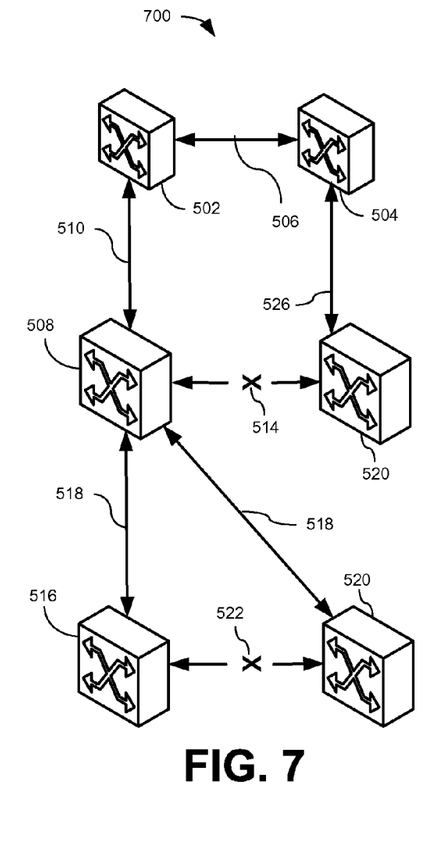
FIG. 7 illustrates an example of the configuration of the spanning tree network after employing a predetermined alternate configuration in response to the link failure illustrated in FIG. 6.

FIG. 7 illustrates an example of the configuration 700 of the spanning tree network 500 after employing a predetermined alternate configuration in response to the link failure illustrated in FIG. 6. In the illustrated example, switches 502 and 504 switch the ports coupled with link 506 to the open state to allow traffic on link 506 that was previously in the alternate (blocked) state. In an example embodiment, the switches 502, 504, 508, 512, 516, and 520 will flood packets (except for on the ports the packet was received on) until the addresses of the switches 502, 504, 508, 512, 516, and 520 are flushed from the Forwarding tables and relearned on the new topology 500. For example, switch 502 may flood packets onto links 506 and 510 and switch 504 may flood packets onto link 506 and 526. In particular embodiments, switches that were not affected by the link failure and/or did not have any configuration changes, such as switches 516 and 520 and 504 may continue operation without flooding packets.

Figure 8:
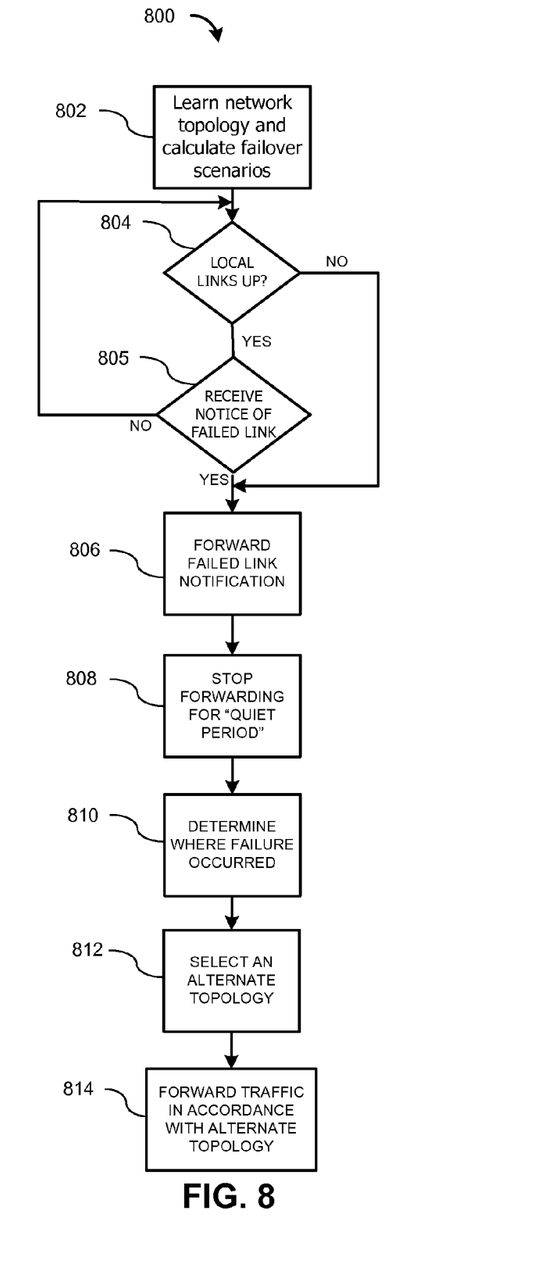
FIG. 8 illustrates an example of a methodology for performing failover in response to a link failure.
Figure 9:
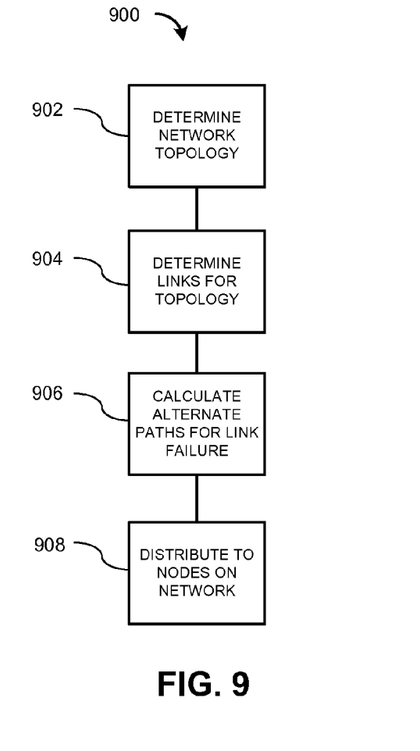
FIG. 9 illustrates an example of a methodology for configuring a network.

In view of the foregoing structural and functional features described above, methodologies in accordance with example embodiments will be better appreciated with reference to FIGS. 8 and 9. While, for purposes of simplicity of explanation, the methodologies of FIGS. 8 and 9 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies described herein. The methodologies described herein are suitably adapted to be implemented in hardware, software, or a combination thereof.

FIG. 8 illustrates an example of a methodology 800 for performing failover in response to a link failure. Methodology 800 may be performed by routing logic 102 (FIG. 1) and logic embodied in ports 104-1 and 104-N (FIG. 1), and/or processor 304 (FIG. 3). Moreover, methodology 800 may be implemented by any of switches 402, 404, 408, and/or 412 (FIG. 4) and/or any of switches 502, 504, 508, 512, 516, and/or 520 (FIG. 5).

At 802 an initial configuration is obtained. The initial configuration may be obtained from an external device such as a server or master switch, or a device may determine the topology of the network and the initial configuration. For example, the device may send packets identifying the device and neighboring devices detected on the device's ports. The device may also receive packets from neighboring devices that identify device's the neighboring devices have detected as well as packets the neighboring devices received from other devices.

At 804, a determination is made whether a local link has failed. A determination may be made by detecting a link coupled with a port has failed, for example by polling the port and/or waiting for predetermined messages over a predetermined time period. The predetermined time period may suitably comprise a plurality of periodic and/or aperiodic intervals.

If a local link is not up (NO), processing skips to 806; otherwise, at 805 a determination is made whether a notification has been received that a remote link has failed from a neighboring device. The predefined packet, such as a HFL may be received from a neighboring device coupled with any open and/or alternate port. In particular embodiments, the notification comprises data representative of where the link failure occurred. If, at 805, no notification was received of a failed link (NO), 804 and 805 are repeated (either continuously or at predefined intervals). If, however, at 805, a notification was received that a remote link has failed (YES), processing continues at 806.

At 806, a notification of the link failure is forwarded. The link failure notification is forwarded on non-failed (e.g., open and/or alternate) ports. If the link failure was received from a neighboring device, the notification is not forwarded onto the port where the notification was received.

At 808, forwarding of traffic is halted for a predefined time period. In an example embodiment, the time period is selected to allow sufficient time for notification packets to propagate throughout the network.

At 810, a determination is made where the link failure occurred. In an example embodiment, the determination is based on data received in the link failure notification.

At 812, a previously obtained alternate configuration for that is appropriate remedying the failed link is implemented. A device's ports are adjusted in accordance with the appropriate alternate configuration. For example, based on the alternate configuration, previously blocked ports may be opened to allow traffic and/or previously opened ports may be closed, or the ports may remain unchanged.

At 814, traffic is forwarded in accordance with the alternate configuration. After a predefined time period, new alternate configurations may be determined for handling a failover for the current (alternate) topology. Packets may be flooded onto the network until the appropriate forwarding paths are determined.

FIG. 9 illustrates an example of a methodology 900 for configuring a network. The methodology 900 may be implemented by device 200 (FIG. 2) and/or processor 304 (FIG. 3).

At 902, the network topology is determined. In an example embodiment, devices on the network sends packets comprising data identifying the device sending the packet and data representative of neighboring devices that the device has detected, and on which ports. Based on the received data, the topology for the network can be determined. Moreover, data may be obtained that indicates whether the network is a ring, star, mesh or other network.

At 904, links for the topology are determined. The status of the links, open or alternate (blocked) are selected in order to prevent looping or network storms.

At 906, alternate paths are determined for remedying link failures. For example, based on a certain link failing, which ports should be opened and/or blocked that will allow the network to function while preventing network loops. A plurality of alternate configurations corresponding to a plurality of potential link failures may be determined.

At 908, the alternate configurations are distributed to nodes on the network. In an example embodiment, if an alternate configuration becomes the active configuration for the network, new alternate configurations can be determined for the network and distributed to the nodes on the network.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a plurality of ports in mutual operative communication via a plurality of associated links interconnecting the plurality of ports;
routing logic coupled with the plurality of ports, the routing logic selectively routing data to the plurality of ports via the plurality of associated links;
wherein the routing logic obtains data representative of a first port configuration for the plurality of ports, the first port configuration comprising data representative of a status for a set of individual ports selected from the plurality of ports, the status indicating whether an individual port selected from the plurality of ports is an open port, an alternate port, or a failed port;
wherein the routing logic forwards the data in accordance with the first configuration; and
wherein the routing logic obtains data representative of an alternate port configuration for the plurality of ports, the alternate port configuration to be employed upon determining a predefined link of the plurality of associated links has failed, the alternate configuration comprising a new status for the set of individual ports selected from the plurality of ports.

2. The apparatus set forth in claim 1, wherein the routing logic switches to the alternate port configuration in response to determining the predefined link has failed; and
wherein a notification of the failed link is propagated though open ports and alternate ports selected from the plurality of ports.

3. The apparatus set forth in claim 2, wherein the predefined link is connected to a selected one of the plurality of ports;
wherein the routing logic switches to the alternate port configuration in response to detecting the predefined link has failed; and
wherein the routing logic generates the notification of the failed link that is propagated through the open ports and alternate ports.

4. The apparatus set forth in claim 3, wherein the failed link is detected by polling the selected one of the plurality of ports.

5. The apparatus set firth in claim 3, wherein the failed link is detected in response to not receiving a predefined packet at the selected one of the plurality of ports for more than a predefined time period.

6. The apparatus of claim 2, wherein the routing logic receives a predefined packet indicating the predefined link has failed.

7. The apparatus set forth in claim 2, wherein the predefined packet comprises data representative of an identifier for the failed link.

8. The apparatus set forth in claim 2, wherein the routing logic stops forwarding traffic in response to determining the predefined link has failed; and
wherein the routing logic waits for a predetermined time period after determining the predefined link has failed before forwarding traffic as specified by the alternate port configuration.

9. The apparatus set forth in claim 2, wherein the routing logic stops forwarding traffic in response to determining the predefined link has failed;
wherein the routing logic waits for a predetermined time period after determining the predefined link has failed before forwarding traffic; and
wherein the routing logic forwards traffic in accordance with the first port configuration in response to determining the failed link has healed before the predetermined time period expired.

10. The apparatus set forth in claim 2, wherein the routing logic obtains data representative of a second alternate port configuration to be employed in response to a second link failing while employing the first alternate configuration.

11. The apparatus set forth in claim 1, wherein the data representative of a first configuration and the data representative of an alternate configuration comprise separate port statuses for individual ports selected from the plurality of ports on a per virtual local area network basis for a plurality of virtual local area networks.

12. The apparatus set forth in claim 1, wherein the routing logic determines a topology of a network coupled with the plurality of ports; and
the routing logic determines the first configuration and alternate configuration based on the topology.

13. The apparatus set forth in claim 1, wherein the data representative of an alternate port configuration comprises data representative of a first alternate port configuration to be employed upon determining a first predefined link has failed, and data representative of a second alternate port configuration to be employed upon determining a second predefined failed link.

14. The apparatus set forth in claim 1, wherein the data representative of an alternate port configuration comprises data representative of a plurality of alternate port configurations corresponding to a plurality of predefined link failures.

15. Logic encoded in a non-transitory tangible computer readable medium for execution by a processor and when executed operable to:
- obtain data representative of a first port configuration for a plurality of ports in mutual operative communication via a plurality of associated links interconnecting the plurality of ports, the first port configuration comprising data representative of a status for a set of individual ports selected from the plurality of ports, the status indicating whether an individual port selected from the plurality of ports is an open port, an alternate port, or a failed port;
- forward data in accordance with the first configuration; and
- obtain data representative of an alternate port configuration for the plurality of ports, the alternate configuration to be employed upon the detection of a failure for a predefined link of the plurality of associated links, and the alternate configuration comprising a new status for the set of individual ports selected from the plurality of ports.

16. The logic according to claim 15, further operable to:
- obtain a notification that the predefined link has failed;
- propagate the notification to open ports selected from the plurality of ports and alternate ports selected from the plurality of ports; and
- forward data in accordance with the alternate port configuration responsive to obtaining the notification that the predefined link has failed.

17. The logic according to claim 16, further operable to stop forwarding data in response to obtaining the notification that the predefined link has failed; and
- wait for a predefined time period after obtaining the notification that the predefined link has failed before forwarding data in accordance with the alternate port configuration.

18. A method, comprising:
- obtaining by routing logic of an associated apparatus data representative of a first port configuration for a plurality of associated ports operatively coupled with the associated routing logic and in mutual operative communication via a plurality of associated links interconnecting the plurality of ports, the first port configuration comprising data representative of a status for a set of individual ports selected from the plurality of ports, the status indicating whether an individual port selected from the plurality of ports is an open port, an alternate port, or a failed port;
- obtaining by the routing logic data representative of an alternate port configuration for the plurality of ports, the alternate configuration to be employed upon the detection of a failure for a predefined link of the plurality of associated links, and the alternate configuration comprising a new status for the set of individual ports selected from the plurality of ports; and
- forwarding by the routing logic data in accordance with the first port configuration while the predefined link is operational.

19. The method according to claim 18, further comprising:
- obtaining a notification that the predefined link has failed;
- propagating the notification via open ports selected from the plurality of ports and alternate ports selected from the plurality of ports; and
- forwarding data in accordance with the alternate port configuration responsive to obtaining the notification that the predefined link has failed.

20. Logic encoded in a non-transitory tangible computer readable medium for execution by an associated processor and when executed by the associated processor the logic being operable to:
- determine a topology of a network, the network comprising a plurality of routing devices in mutual operative communication via a plurality of associated links interconnecting the plurality of routing devices of the network;
- determine a first port configuration based on the topology, the first port configuration comprising data representative of open ports and alternate ports for the plurality of routing devices coupled in the network; and
- determine an alternate a port configuration based on the topology, the alternate configuration comprising data representative of open ports and alternate ports for the plurality of routing devices to use in response to a predefined associated link of the plurality of associated links failing.

* * * * *